United States Patent [19]
Nishiguchi et al.

[11] Patent Number: 5,166,824
[45] Date of Patent: Nov. 24, 1992

[54] REAR PROJECTION SCREEN AND MANUFACTURING METHOD THEREFOR AS WELL AS MOLDING DIE FOR SHAPING REAR PROJECTION SCREEN, OVERHEAD PROJECTOR AND PROJECTION TELEVISION SET

[75] Inventors: Takashi Nishiguchi; Masami Masuda; Noriyuki Taguchi, all of Yokohama, Japan

[73] Assignee: Hitachi, Ltd., Chiyoda, Japan

[21] Appl. No.: 782,588

[22] Filed: Oct. 25, 1991

[30] Foreign Application Priority Data

Oct. 30, 1990 [JP] Japan .................. 2-290937

[51] Int. Cl.⁵ ............................ G03B 21/60
[52] U.S. Cl. ................................. 359/456
[58] Field of Search .......... 359/456, 460; 204/6; 430/6; 355/53

[56] References Cited

U.S. PATENT DOCUMENTS 5,091,744  2/1992  Omata ................. 355/53

FOREIGN PATENT DOCUMENTS 58-216234  12/1983  Japan .
58-216235  12/1983  Japan .

Primary Examiner—Richard A. Wintercorn
Attorney, Agent, or Firm—Antonelli, Terry, Stout & Kraus

[57] ABSTRACT

In a rear projection screen, a plurality of convex lenses of the prescribed configuration are made of photoresist and formed and arranged on a surface or surfaces of a substrate in the prescribed pattern. In case that the convex lenses are formed in the shapes of ellipsoid, the longer radial direction of the ellipsoid is made to coincide with the horizontal direction and shapes of the lenses are changed gradually from the center of the screen to the extremity thereof. Bottom surfaces of non-lens boundary grooves between adjacent convex lenses are made rougher than the convex lens surfaces. A screen manufacturing method comprises the steps of applying photoresist onto a surface or surfaces of a substrate, exposing a patttern of boundary grooves onto the photoresist by photolithography, forming the boundary grooves by etching, and heating and melting the photoresist which is formed with the boundary grooves so as to form a plurality of convex lenses having the prescribed configuration. Further, it is possible to form a plurality of convex lenses of the prescribed configuration by rotating the substrate about the center thereof in the horizontal plane following the heating and melting step. In addition, it is possible, in forming the boundary grooves, to change the setting conditions of etching so that the bottom surfaces of the boundary grooves are made rougher than the convex lens surfaces.

14 Claims, 3 Drawing Sheets

REAR PROJECTION SCREEN AND MANUFACTURING METHOD THEREFOR AS WELL AS MOLDING DIE FOR SHAPING REAR PROJECTION SCREEN, OVERHEAD PROJECTOR AND PROJECTION TELEVISION SET

BACKGROUND OF THE INVENTION

This invention relates to a rear projection screen and a manufacturing method therefor on which screen an image is made visible for viewing on the front surface side by being projected from the rear surface side, to a molding die for shaping rear projection screens which is suitable to manufacture the rear projection screen concerned, and to an overhead projector and a projection television set serving as a projection system which is equipped with the rear projection screen concerned.

Heretofore, there has already been known the rear projection screen on which an image projected from the rear surface side is made visible for viewing from the front surface side, and it is the real state that various types of rear projection screens have been proposed. In recent years, particularly, it is necessary for color televisions that the rear projection screen to be used in adding different images of primary colors consisting of red, green and blue on the picture must be a screen of the special configuration unlike the screen of a color slide projector or of a motion picture projector which is to be used in projecting a multicolored image itself.

By the way, examples of the rear projection screen which is to be used in adding on the picture the different images of the primary colors consisting of red, green and blue as in the case of the color television are disclosed in Japanese Patent Unexamined Publication Nos. 58-216234 and 58-216235, for example. In these screens, a plurality of convex lenses are arranged on one side so as to form a first lens surface, another plurality of convex lenses are installed on the other side in such a manner that the optical axis of these lenses coincides with that of the convex lenses of the first lens surface, so as to form a second lens surface, and a light screening layer is installed to convex parts in the non-condensing part of the convex lenses of the first lens surface which are projected forward from the second lens surface.

However, the above-described publications have problems of practical application, although there are described about the material and the manufacturing method of the screen. Namely, it is difficult to manufacture the screen, and therefore, it is impossible to easily obtain the screen at low cost.

SUMMARY OF THE INVENTION

A first object of the present invention is to provide a rear projection screen which can be manufactured easily at low cost and which is to be used in adding different images of primary colors consisting of red, green and blue on the picture as in a color television.

A second object of the invention is to provide a manufacturing method which is suitable to manufacture a rear projection screen.

A third object of the invention is to provide a molding die for shaping a rear projection screen which is to be used in mass-producing rear projection screens at low cost.

A fourth object of the invention is to provide an overhead projector and a projection television set which serve as a projection system equipped with a rear projection screen.

To achieve the above ends, there is provided according to the present invention a rear projection screen in which a plurality of convex lenses having the prescribed configuration and made of photoresist are formed and arranged on a surface or surfaces of a substrate in the prescribed pattern.

According to an aspect of the invention, there is provided a method for manufacturing a rear projection screen which comprises the steps of applying photoresist onto a surface or surfaces of a substrate, exposing by photolithography a pattern of boundary grooves serving to divide convex lenses from each other onto said photoresist, forming the boundary grooves by etching, and heating and melting the photoresist which is formed with the boundary grooves so as to form a plurality of convex lenses having the prescribed configuration.

According to another aspect of the invention, there is provided a method for manufacturing a rear projection screen which comprises the steps of preparing a molding die for shaping a rear projection screen which is formed with concave surfaces complementary to convex lens surfaces of the prescribed configuration, and applying a resin such as PMMA to the molding die by means of hot pressing or the like so as to shape a screen having a plurality of convex lenses of the prescribed configuration formed on a surface or surfaces thereof.

According to still another aspect of the invention, there is provided a molding die for shaping a rear projection screen which is obtained by preparing due to heating and melting of photoresist a rear projection screen in which a plurality of convex lenses of the prescribed configuration are formed and arranged on a surface or surfaces of a substrate in the prescribed pattern, effecting electrolyteless plating on the surface or surfaces of the rear projection screen, and removing from the screen a layer or layers formed by the electrolyteless plating, so that the molding die is formed with concave surfaces complementary to convex lens surfaces of the prescribed configuration.

According to a further aspect of the invention, there is provided an overhead projector or a projection television set which is equipped with a rear projection screen in which a plurality of convex lenses having the prescribed configuration and made of photoresist are formed and arranged on a surface or surfaces of a substrate in the prescribed pattern.

According to the present invention, it is possible to obtain a method for manufacturing a rear projection screen which is formed with a plurality of convex lenses of the prescribed configuration through the steps of applying photoresist onto a surface or surfaces of surfaces of a substrate, exposing by photolithography a pattern of boundary grooves serving to divide convex lenses from each other onto the photoresist, forming the boundary grooves by etching, and heating and melting the photoresist which is formed with the boundary grooves so as to form a plurality of convex lenses having the prescribed configuration. According to this manufacturing method, it is possible to easily obtain a rear projection screen at low cost without requiring any complicated machining such as cutting or polishing with respect to each of the plural convex lenses.

Further, according to the invention, it is possible to mass-produce rear projection screens at low cost by making use of a method which comprises the steps of preparing a molding die for shaping a rear projection screen which is formed with concave surfaces complementary to convex lens surfaces of the prescribed configuration, and applying a resin such as PMMA to the molding die by means of hot pressing or the like so as to shape a screen having a plurality of convex lenses of the prescribed configuration formed on a surface or surfaces thereof in the prescribed pattern. Particularly, it is possible to easily obtain a molding die for shaping a rear projection screen which is suitable to mass-production, by preparing due to heating and melting of photoresist a rear projection screen in which a plurality of convex lenses of the prescribed configuration are formed and arranged on a surface or surfaces of a substrate in the prescribed pattern, effecting electolyteless plating on the surface or surfaces of the rear projection screen, and removing from the screen a layer or layers formed by the electrolyteless plating.

The rear projection screen to be obtained as described above can be easily applied to the overhead projector and projection television set, and therefore, it is possible to obtain an inexpensive overhead projector or projection television set if equipped with the screen converned.

DESCRIPTION OF THE PREFERRED EMBODIMENTS

Description will be given below of the present invention with reference to FIGS. 1 to 8.

Figure 1:
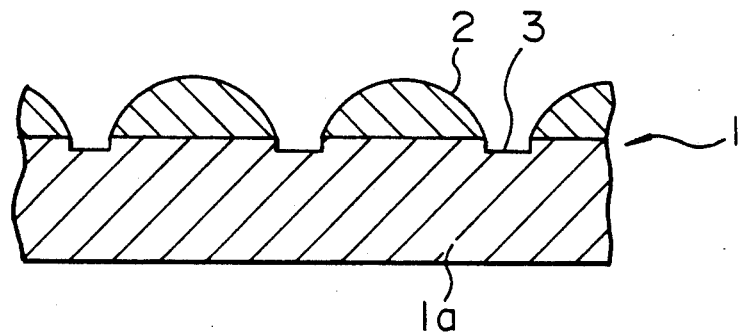
FIGS. 1 and 2 are an enlarged vertical sectional view and an enlarged perspective view, respectively, showing essential portions of a rear projection screen of basic structure according to the present invention.
Figure 2:
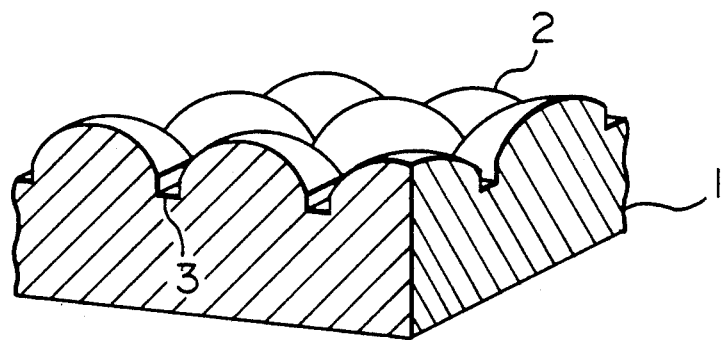

An example of a rear projection screen of basic structure of the present invention is shown in FIGS. 1 and 2 which are an enlarged vertical sectional view and an enlarged perspective view of essential portions thereof, respectively. As shown in FIGS. 1 and 2, a rear projection screen 1 is constructed such that a plurality of convex lenses 2 made of photoresist are formed and arranged on a substrate 1a made of optical plastic having a high light transmission factor, for example, in the prescribed pattern with the lenses being divided from each other by boundary grooves 3. In FIGS. 1 and 2, the convex lenses 2 are arranged on one surface of the substrate 1a, and however, they may be arranged on both surfaces thereof. A large number of convex lenses 2 each having a surface shape of partial sphere, partial ellipsoid, or partial paraboloid, are arranged regularly in vertical and horizontal directions or in the hexagonal lattice.

The basic structure of the rear projection screen is as described above. Description will be given now of a manufacturing method of such screen.

Figure 3:
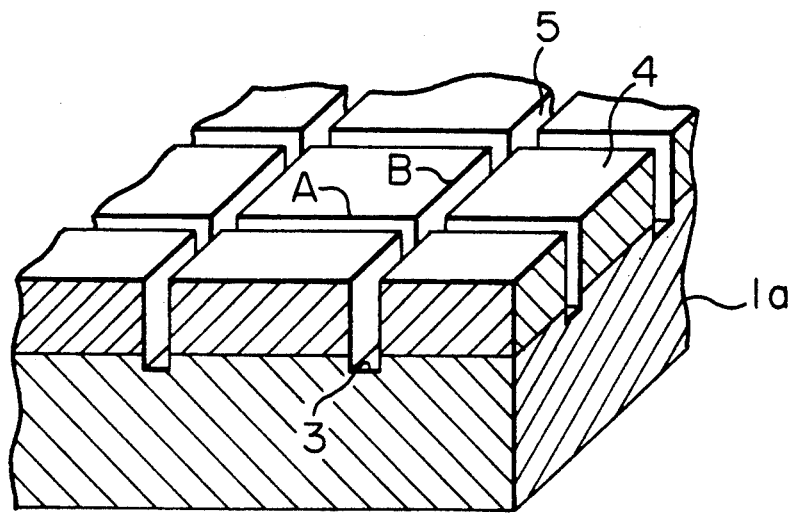
FIG. 3 is an enlarged perspective view showing essential portions of the rear projection screen in a state where boundary grooves have been formed as one of steps of the manufacturing process thereof.

Namely, in case of manufacturing the rear projection screen, photoresist 4 is applied uniformly onto one surface of the substrate 1a and exposed with a pattern 5 for the formation of the boundary grooves 3 serving to divide the convex lenses from each other due to photolithography, and the boundary grooves 3 are formed by means of etching which is to be performed until the substrate 1a is slightly etched. FIG. 3 is an enlarged perspective view of essential portions of the screen in a state where the boundary grooves 3 have been just formed. By heating and melting the photoresist 4 after the formation of the boundary grooves 3, a plurality of convex lenses of the prescribed shape can be formed with ease.

Figure 4:
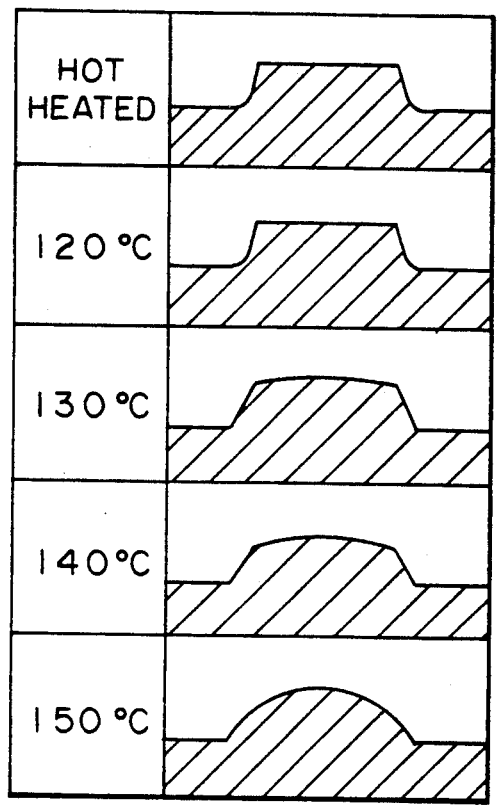
FIG. 4 is a diagram showing the change of the sectional shape of the photoresist according to the heating temperature after being subjected to the melting and solidification in the process of forming the convex lenses by heating and melting the photoresist.

FIG. 4 shows the change of the sectional shape of the photoresist 4 according to the heating temperature after being subjected to the melting and solidification in the process of forming the convex lenses by heating and melting the photoresist. As shown in the diagram, when the heating temperature is 120° C., the cross-sectional shape of the photoresist 4 is nearly the same as that obtained without heating. As the heating temperature is increased to 130° C. and 140° C., the cross-sectional shape of the photoresist 4 becomes similar to that of the convex lens owing to the melting and solidification of the photoresist 4. When the heating temperature is set at 150° C., the cross-sectional shape becomes the shape of the convex lens nearly completely. In consequence, by utilizing this phenomenon, it is possible to form the convex lenses made of the photoresist 4 on the substrate 1a with ease.

The method for manufacturing a rear projection screen due to heating and melting of the photoresist according to the above embodiment is a little unfavorable to mass production. In order to mass-produce the rear projection screens at low cost, it is considered to use a molding die for shaping. Namely, a molding die for shaping a rear projection screen is prepared suitably by some method beforehand such as to be formed with concave surfaces complementary to the convex lens surfaces of the prescribed configuration, so that, by applying a resin such as PMMA to be shaped by hot pressing or the like or an ultraviolet-setting resin, it is possible to mass-produce the rear projection screen with a plurality of convex lenses of the prescribed shape being formed regularly on one surface or on both surfaces thereof.

Figure 5:
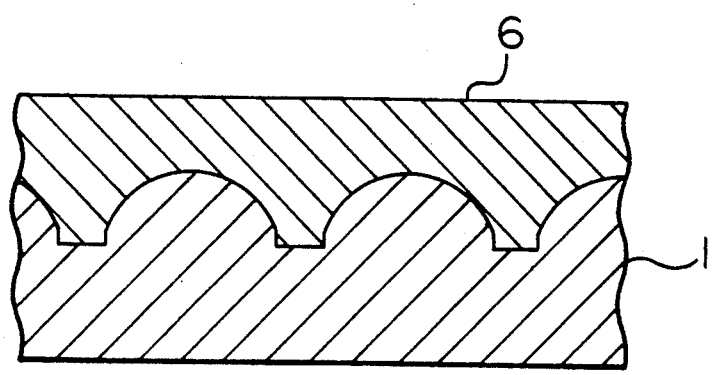
FIG. 5 is a sectional view for explanation of the method for forming a molding die for shaping a rear projection screen by effecting electrolyteless plating onto an existing rear projection screen.

As described before, the molding die for shaping can be made easily by making use of the rear projection screen manufactured by heating and melting the photoresist. FIG. 5 shows the method for forming such molding die for shaping. As shown in the drawing, an Ni electrolyteless plating layer 6 is formed to cover the surface of the rear projection screen 1 on which surface the convex lenses are formed. Thereafter, the Ni electrolyteless plating layer 6 is removed from the screen 1 so as to obtain a mother of the shape complementary to that of the screen 1. The mother is lined with chill so as to be used as the molding die for shaping.

Description has been made hereinabove about the basic structure of the rear projection screen, the manufacturing method therefor, and the molding die for shaping which is suitable for manufacturing the rear projection screen. Now, description will be given of modifications in terms of structure and manufacturing method.

Figure 6:
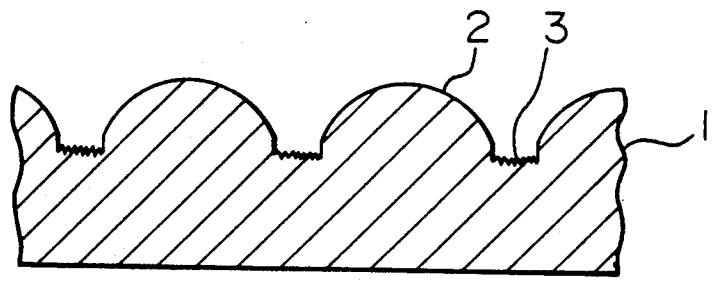
FIG. 6 is an enlarged vertical sectional view showing essential portions of a rear projection screen in which the bottom surfaces of the boundary grooves are made rougher than the lens surfaces.

First, the rear projection screen often suffers from the problem that ghost image arises due to the light coming through the non-lens surface. To cope with this, it is effective to make rougher the non-lense surface, that is, the boundary groove bottom surface in comparison with the lens surface. FIG. 6 shows the state where the bottom surfaces of the boundary grooves 3 are made rougher than the lens surfaces. Each of the boundary grooves 3 as the non-lens surface is located between adjacent convex lenses 2 so that it becomes possible to make such boundary groove rough by setting the etching condition adequately when the boundary grooves 2 are to be formed by means of the photolithography described before.

Figure 7:
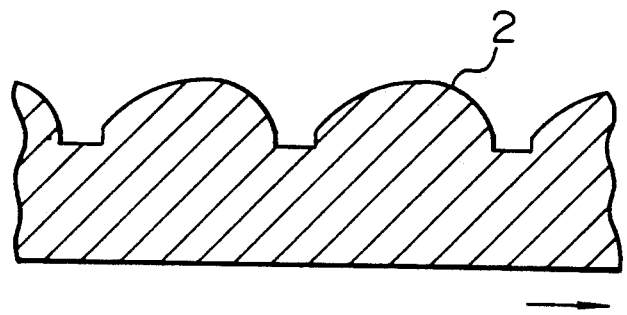
FIGS. 7 and 8 are an enlarged vertical sectional view and an enlarged perspective view, respectively, showing essential portions of a rear projection screen in which the shapes of the convex lenses are changed from the center of the screen to the extremity thereof.
Figure 8:
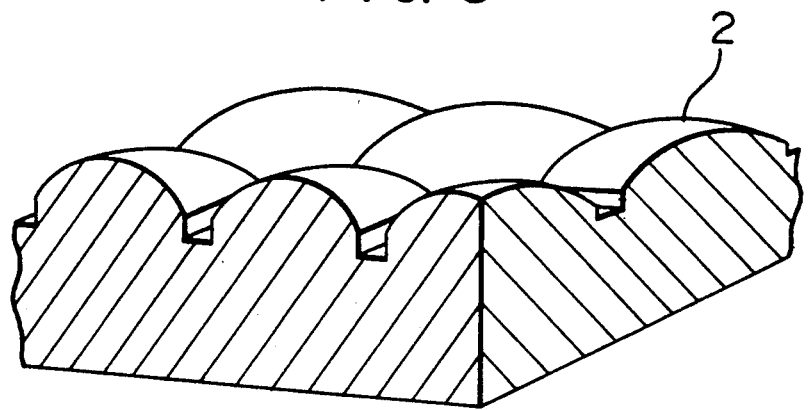

On the other hand, in order to assure the luminance of the picture by condensing the light from the rear projection screen towards an observer, the shape of the convex lenses are changed as their positions shift from the center of the screen to the extremity thereof, thereby making it possible to direct the light from the convex lenses to the observer as desired. FIGS. 7 and 8 are an enlarged cross sectional view and an enlarged perspective view, respectively, showing essential portions of an example of the rear projection screen in which the shapes of the convex lenses are changed as their positions shift from the center of the screen to the extremity thereof. In order to obtain such rear projection screen, in the solidification step following the heating and melting of the photoresist, the substrate is rotated in the horizontal plane about the center thereof, thereby making it possible to change the shapes of the convex lenses as the positions of the convex lenses shift from the center of the screen to the extremity thereof. Alternatively, even by varying the pitch of the boundary grooves 3 from the center of the screen towards the extremity thereof, the same effect can be obtained. It goes without saying that by subjecting the screen obtained in this way to the Ni electrolyteless plating to obtain a molding die for shaping, it is possible to obtain a desired rear projection screen.

In addition, in case that the rear projection screen is observed by a plurality of observers, it is desirable to widen the condensing characteristic of the screen in the horizontal direction. In order to obtain such screen, in forming the boundary grooves by means of the photolithography, lengths of sides A and B may be so set as to satisfy A>B when the side A is directed in the horizontal direction in each convex lens forming region, as shown in FIG. 3. By so doing, it is possible to obtain a rear projection screen in which a plurality of convex lenses are so formed that the longer radial direction of the ellipsoid coincides with the horizontal direction. By obtaining the molding die for shaping using this screen, it is possible to mass-produce the rear projection screens suitable to be viewed by the plural observers at low cost.

Finally, it is considered easily that the various types of rear projection screens described above are applicable to an overhead projector and a projection television set.

What is claimed is:

1. A rear projection screen in which a plurality of convex lenses having the prescribed configuration and made of photoresist are formed and arranged on a surface or surfaces of a substrate in the prescribed pattern.

2. A rear projection screen in which a plurality of convex lenses having the shape of an ellipsoid and made of photoresist are formed and arranged on a surface or surfaces of a substrate in the prescribed pattern so that the longer radial direction of the ellipsoid coincides with the horizontal direction.

3. A rear projection screen in which a plurality of convex lenses having the shape of an ellipsoid and made of photoresist are formed and arranged on a surface or surfaces of a substrate in the prescribed pattern so that shapes of the lenses are changed gradually from the center of the screen to the extremity thereof.

4. A rear projection screen in which a plurality of convex lenses made of photoresist are formed and arranged on a surface or surfaces of a substrate in the prescribed pattern so that bottom surfaces of non-lens boundary grooves between adjacent convex lenses are made rougher than the convex lens surfaces.

5. A method for manufacturing a rear projection screen comprising the steps of: applying photoresist onto a surface or surfaces of a substrate; exposing by photolithography a pattern of boundary grooves serving to divide convex lenses from each other onto said photoresist; forming the boundary grooves by etching; and heating and melting the photoresist which is formed with said boundary grooves so as to form a plurality of convex lenses having the prescribed configuration.

6. A method for manufacturing a rear projection screen comprising the steps of: applying photoresist onto a surface or surfaces of a substrate; exposing by photolithography a pattern of boundary grooves serving to divide convex lenses from each other onto said photoresist; forming the boundary grooves by etching; heating and melting the photoresist formed with said boundary grooves; and rotating said substrate about the center thereof in the horizontal plane so as to form a plurality of convex lenses having the prescribed configuration.

7. A method for manufacturing a rear projection screen comprising the steps of: applying photoresist onto a surface or surfaces of a substrate; forming a pattern of non-lens boundary grooves serving to divide convex lenses from each other onto said photoresist and making the bottom surface of the boundary grooves rougher than the convex lens surface; and forming a plurality of convex lenses having the prescribed configuration.

8. A method for manufacturing a rear projection screen comprising the steps of: preparing a molding die for shaping a rear projection screen which is formed with concave surfaces complementary to convex lens surfaces of the prescribed configuration; and applying a resin such as PMMA to said molding die by means of hot pressing or the like so as to shape a screen which has a plurality of convex lenses of the prescribed configuration formed on a surface or surfaces thereof in the prescribed pattern.

9. A method for manufacturing a rear projection screen comprising the steps of: preparing a molding die for shaping a rear projection screen which is formed with concave surfaces complementary to convex lens surfaces of the prescribed configuration; and applying an ultraviolet-setting resin to said molding die so as to shape a screen which has a plurality of convex lenses of the prescribed configuration formed on a surface or surfaces thereof in the prescribed pattern.

10. A method for manufacturing a rear projection screen comprising the steps of: preparing due to heating and melting of photoresist a rear projection screen in which a plurality of convex lenses of the prescribed configuration are formed and arranged on a surface or surfaces of a substrate in the prescribed pattern; effecting electrolyteless plating on said surface or surfaces of the rear projection screen; removing from said screen a layer or layers formed by said electrolyteless plating; forming from said electrolyteless plated layer or layers a molding die for shaping a rear projection screen which is formed with concave surfaces complementary to convex lens surfaces of the prescribed configuration; and applying a resin such as PMMA to said molding die so as to shape a screen which has a plurality of convex lenses of the prescribed configuration formed on a surface or surfaces thereof in the prescribed pattern.

11. A molding die for shaping a rear projection screen, which is obtained by preparing due to heating and melting of photoresist a rear projection screen in which a plurality of convex lenses of the prescribed configuration are formed on a surface or surfaces of a substrate in the prescribed pattern, effecting electolyteless plating on said surface or surfaces of the rear projection screen, and removing from said screen a layer or layers formed by said electrolyteless plating, so that said molding die is formed with concave surfaces complementary to convex lens surfaces of the prescribed configuration.

12. An overhead projector which is equipped with a rear projection screen in which a plurality of convex lenses having the prescribed configuration and made of photoresist are formed and arranged on a surface or surfaces of a substrate in the prescribed pattern.

13. A projection television set which is equipped with a rear projection screen in which a plurality of convex lenses having the prescribed configuration and made of photoresist are formed and arranged on a surface or surfaces of a substrate in the prescribed pattern.

14. A method for manufacturing a rear projection screen according to claim 7, wherein the step of forming a pattern of boundary grooves includes exposing by photolithography a pattern of boundary grooves serving to divide convex lenses from each other onto said photoresist and forming the boundary grooves by etching so as to make the bottom surface of the boundary grooves rougher than the convex lens surface, the step of forming a plurality of convex lenses having the prescribed configuration including heating and melting the photoresist which is formed with the boundary grooves so as to form the plurality of convexlenses having the prescribed configuration.

* * * * *